United States Patent [19]

Yano

[11] Patent Number: 4,671,534
[45] Date of Patent: Jun. 9, 1987

[54] VEHICLE HAVING ADJUSTABLE SUSPENSION

[75] Inventor: Toshihide Yano, Susono, Japan

[73] Assignee: Toyota Jidosha Kabushiki Kaisha, Toyota, Japan

[21] Appl. No.: 806,495

[22] Filed: Dec. 9, 1985

[30] Foreign Application Priority Data

Jan. 14, 1985 [JP] Japan ................................. 60-3241

[51] Int. Cl.$^4$ ..................... B60G 11/26; B60G 17/00
[52] U.S. Cl. .................................. 280/707; 180/282; 280/689; 280/708
[58] Field of Search ........... 280/707, 689, 772, 112 A, 280/708; 180/282, 283, 284, 285, 172, 141, 142

[56] References Cited

U.S. PATENT DOCUMENTS

| | | | |
|---|---|---|---|
| 3,603,612 | 9/1971 | Hill | 280/707 |
| 3,770,292 | 11/1973 | Palazzetti | 280/708 |
| 4,333,668 | 6/1982 | Hendrickson et al. | 280/707 X |
| 4,468,739 | 8/1984 | Woods et al. | 280/707 X |
| 4,506,751 | 3/1985 | Stephens | 280/772 X |
| 4,564,214 | 1/1986 | Tokunaga et al. | 180/141 |

FOREIGN PATENT DOCUMENTS

| | | | |
|---|---|---|---|
| 2331684 | 1/1975 | Fed. Rep. of Germany | 180/141 |
| 59-227514 | 12/1984 | Japan | 280/707 |

Primary Examiner—John J. Love
Assistant Examiner—Charles R. Watts
Attorney, Agent, or Firm—Oblon, Fisher, Spivak, McClelland & Maier

[57] ABSTRACT

Each of suspensions provided on a vehicle includes a shock absorber capable of adjusting the damping force and an air spring capable of adjusting the spring constant. Small ports are provided respectively on two front sides of a car body suspended from the suspensions and pipes each of which is connected on one end to one of the small ports and connected on the other ends to a pressure sensor. A control unit calculates the size of a lateral force according to signals of a vehicle speed sensor provided on the car body and the pressure sensor and controls each of the suspensions such that the damping force of the shock absorber and the spring constant of the air spring are made rigid when the size of the lateral force exceeds a certain value.

7 Claims, 8 Drawing Figures

VEHICLE HAVING ADJUSTABLE SUSPENSION

BACKGROUND OF THE INVENTION

1. Field of the Invention

This invention relates to a vehicle, and more particularly to a vehicle provided with a suspension capable of varying the characteristics thereof.

2. Description of the Prior Art

An automobile is known in which the characteristics of a suspension such as damping force of a shock absorber and spring constant of an air spring surrounding the shock absorber are variable and can be adjusted during travelling. The automobile can thus be provided with ride comfort and controllability corresponding the travelling condition.

SUMMARY OF THE INVENTION

Now, when a vehicle is travelling with high speed and receives a side wind, unstable factors such as the lateral movement of the vehicle generating yaw velocity to give a feeling of shock to a driver or rolling, may generate an uneasy feeling in the driver.

An object of the present invention is to provide a vehicle including suspensions capable of varying the characteristics thereof, which can restrain the generation of the unstable factors to remove the uneasy feeling of a driver when it receives a side wind and improve further the controllability.

A vehicle according to the present invention comprises suspensions capable of varying the characteristics thereof, a pressure sensor having pressure detecting means provided respectively at both sides of a car body suspended from the suspensions, a vehicle speed sensor provided on said car body and a unit for calculating an amount of lateral force from signals of the vehicle speed sensor and the pressure sensor and controlling the suspensions so as to make the characteristics of the suspensions rigid when the amount of the lateral force exceeds a certain value.

When the vehicle is travelling with speed exceeding a certain speed and receives a side wind, signals of the speed sensor and the pressure sensor are sent to the input of the control unit. The control unit calculates an aerodynamic sideslip angle from the speed and a lateral force caused by side wind. The unit controls each of the suspensions to make the characteristics thereof rigid when the lateral force exceeds a predetermined value, i.e., to increase the damping force of a shock absorber or heighten the spring constant of an air spring or increase the damping force while heightening the spring constant. When the characteristics of each of the suspensions is made rigid, the unstable factors caused by side wind are restrained by the suspensions.

According to the present invention there are obtained the following effects.

When the vehicle is travelling with speed exceeding a certain speed and receives side wind, the characteristics of each of the suspensions is made rigid by the control unit so that the generation of unstable factors such as the lateral movement of the vehicle, the feeling of shock given to a driver by the generation of yaw velocity and rolling can be restrained to reduce a feeling of uneasiness in the driver.

By restraining the generation of unstable factors caused by side wind there can be particularly improved the controllability of the vehicle during high speed travelling.

BRIEF DESCRIPTION OF THE DRAWINGS

The other objects and features of the present invention will become apparent from the following description of a preferred embodiment of the invention with reference to the accompanying drawings, in which.

DESCRIPTION OF THE PREFERRED EMBODIMENT

Figure 1:
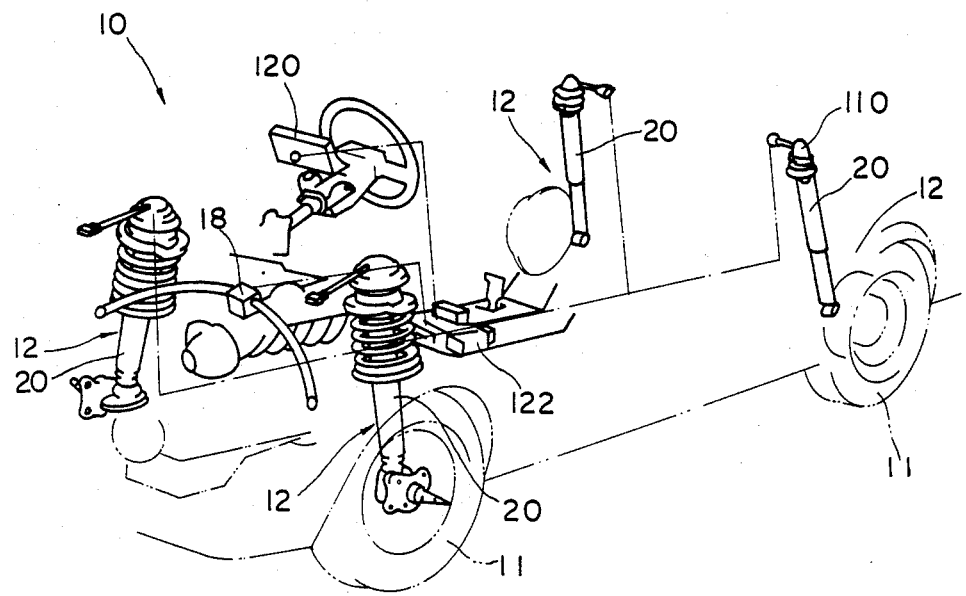
FIG. 1 is a perspective view showing principal parts of a vehicle.
Figure 2:
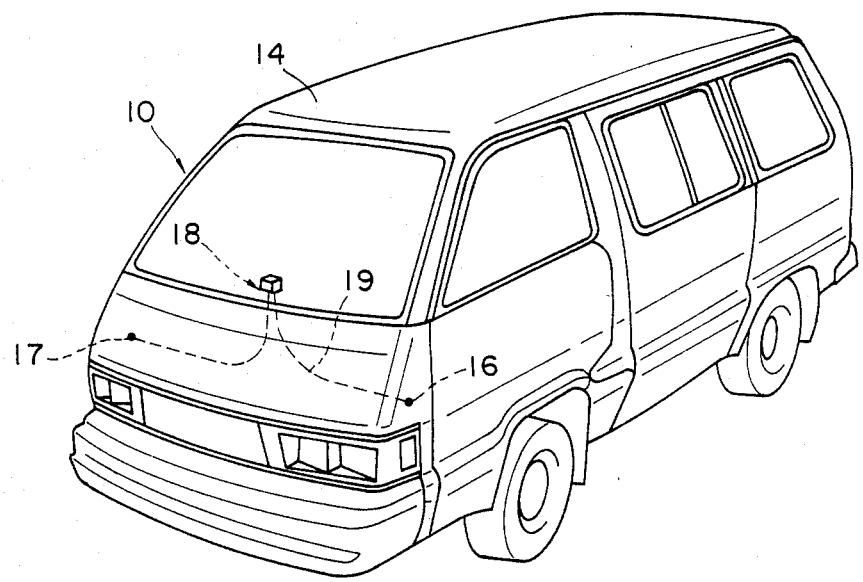
FIG. 2 is a perspective view of the vehicle.

As shown in FIGS. 1 and 2, a vehicle 10 has four suspensions 12 supporting front, rear, left and right wheels 11 and a pressure sensor 18 having a pair of pressure detecting elements 16, 17 provided on two front sides of a car body 14 suspended from the suspensions.

The suspension 12 is provided with a shock absorber 20 capable of varying the damping force. To vary the damping force of the shock absorber 20, a bypass path is provided in a piston or a piston rod in addition to liquid paths provided inherently in the piston disposed slidably in a cylinder. It is constituted such that communication between two liquid chambers defined by the piston through the bypass path is afforded and interrupted.

Figure 3:
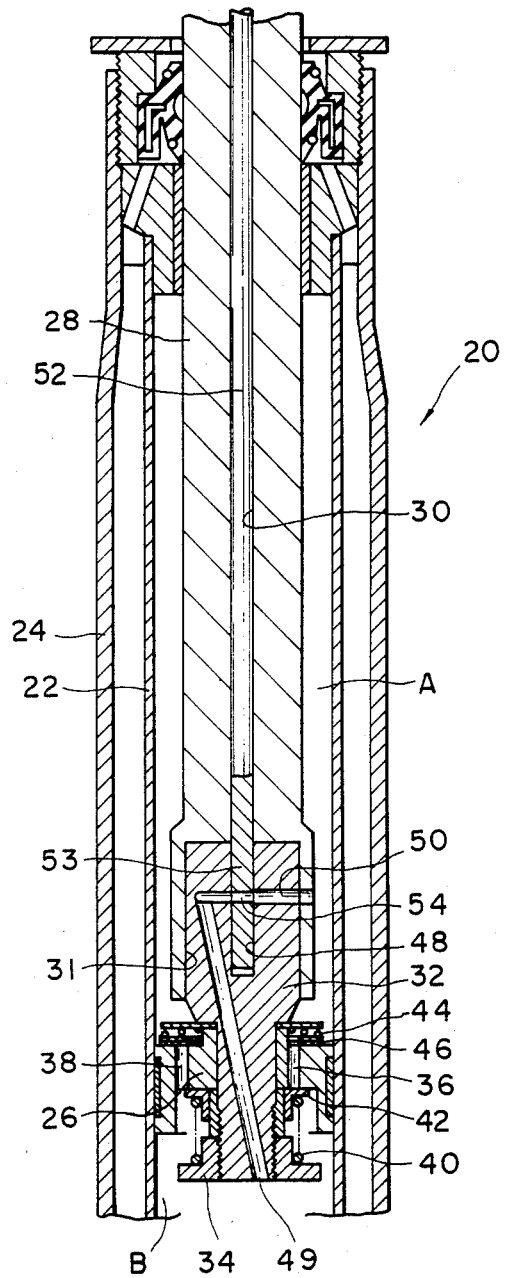
FIG. 3 is a sectional view showing principal parts of a shock absorber.

In an embodiment shown in FIG. 3, the shock absorber 20 is provided with a cylinder 22, a shell 24 spaced from the cylinder 22, a piston 26 disposed movably in the cylinder 22 and a piston rod 28 connected to the piston 26.

The piston rod 28 has a longitudinal hole 30 extending axially from an upper end face and a bored hole 31 provided in a lower end. A connecting member 32 is forced into the bored hole 31. The connecting member 32 extends through the piston 26 and a nut 34 is screwed onto a portion of the connecting member 32 projecting from the piston so that the connecting member 32 is connected to the piston 26. Thus, the piston 26 is coupled with the piston rod 28 through the connecting member 32.

The piston 26 has a plurality of ports 36 spaced circumferentially through which liquid flows in the extension of the piston rod 28 and a plurality of ports 38 spaced circumferentially through which liquid flows in the contraction of same. Liquid chambers A,B partitioned by the piston 26 communicate to each other through the ports 36,38. Valve bodies 42,46 biased respectively by coil springs 40,44 are disposed respectively on a lower side of the ports 36 and on an upper side of the ports 38.

On the other hand, the connecting member 32 has a hole 48 aligned with the longitudinal hole 30 in the piston rod 28, a path 49 extending from an end face over the piston 26 and a path 50 crossing the hole 48 and extending radially from the path 49 to an outer peripheral surface to constitute a bypass path for affording communication between the liquid chambers A,B.

A control rod 52 is rotatably disposed in the longitudinal hole 30 in the piston rod 28 and the hole 48 in the connecting member 32 under liquid-tight conditions. The control rod 52 has a hole 54 extending diametrically therein, which is capable of communicating with the path 50, in a portion 53 inserted into the hole 48 in the connecting member 32. When the hole 54 communicates with the path 50 as shown in the drawing, the liquid chambers A,B communicate with each other through the bypass path, i.e. the path 50, hole 54 and path 49 in addition to the ports 36 or 38 in the piston 26. Therefore, an amount of liquid flowing through the ports in the piston 26 is reduced and the damping force of the shock absorber 20 is reduced. On the other hand, when the control rod 52 rotates and the hole 54 is offset from the path 50, the path 50 is sealed by the control rod 52. Therefore, the amount of liquid flowing through the ports in the piston 26 is increased and the damping force of the shock absorber 20 is increased. The control rod 52 is rotated by an actuator such as a motor.

Figure 4:
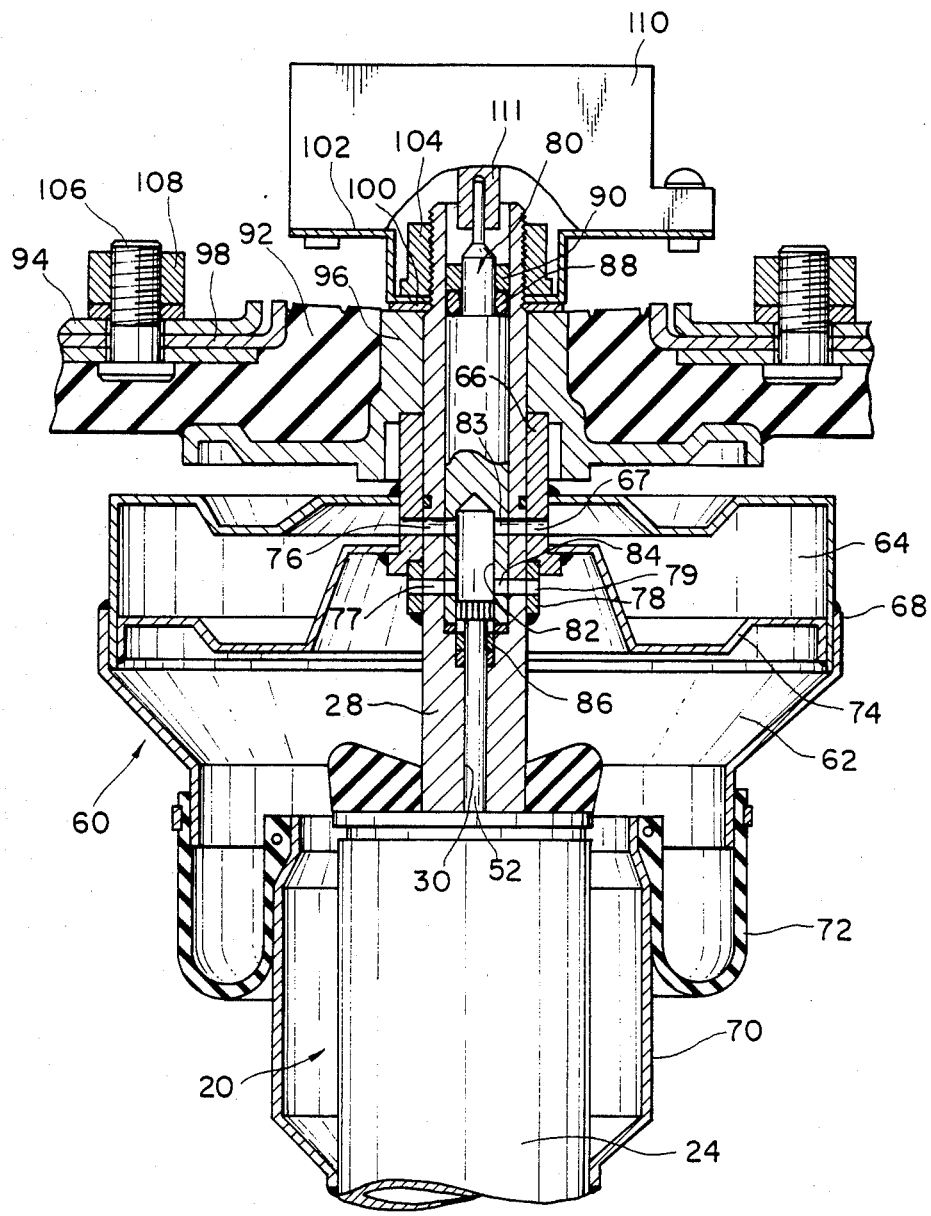
FIG. 4 is a sectional view showing an air spring.

FIG. 4 shows an embodiment in which the spring constant of an air spring 60 together with the damping force of a shock absorber is varied. The air spring 60 has main and auxiliary air chambers 62,64 formed to surround the shock absorber 20 shown in FIG. 3 and is constituted by enclosing compressed air in both air chambers.

The main air chamber 62 is formed of a housing 68 welded under air tight conditions to a cylindrical spacer 66 inserted into the piston rod 28 and a rubber diaphragm 72 having one end fixed to the housing 68 and the other end fixed to an air piston 70 of the shell 24. A partition wall 74 is spanned from the housing 68 to the spacer 66 to define the auxiliary air chamber 64.

Two holes 76,77 extending diametrically from the longitudinal hole 30 in the piston rod 28 and spaced axially from each other are provided. The upper hole 76 communicates to the auxiliary air chamber 64 through a hole 67 in the spacer 66 and the lower hole 77 communicates to the main air chamber 62 through a hole 79 in a ring 78 welded to the piston rod 28. As a result, the main and auxiliary air chambers 62,64 communicate with each other through these holes.

The longitudinal hole 30 in the piston rod 28 has an upper portion expanded with respect to its diameter and a valve body 80 is rotatably disposed in the upper portion. The valve body 80 has a hole 82 bored axially from a lower end face and two holes 83,84 extending diametrically from the hole 82 and spaced axially from each other. The holes 83,84 can communicate respectively with the holes 76,77 in the piston rod.

The control rod 52 is fitted in the hole 82 of the valve body to be coupled with the valve body 80 via serrations at its end. An O-ring 86 is disposed in the longitudinal hole 30 of the piston rod, and the control rod 52 and the valve body 80 are inserted into the longitudinal hole 30. Further, an O-ring 88 is disposed on a shoulder of the valve body 80 and a collar 90 is press fitted into the upper portion of the hole 30, so that the valve body 80 and the control rod 52 are rotatably supported by the piston rod 28 under liquid tight conditions.

The piston rod 28 is coupled with a car body 94 through a bushing 92. In the embodiment shown, the bushing 92 is vulcanized and bonded to two support members 96,98 and the piston rod 28 extends through the support member 96. A washer 100 and a bracket 102 are put onto the piston rod 28 and a nut 104 is screwed onto the piston rod 28 to depress the support member 96 toward the spacer 66 so that the piston rod 28 is connected to the support member 96. On the other hand, bolts 106 serration fitted in the support member 98 via serrations thereon extend through the car body 94 and nuts 108 are screwed onto the bolts 106 to connect the support member 98 to the car body 94.

An actuator 110 for rotating the valve body 80 consists of a motor and a reduction gear well known per se and is fixed to the piston rod 28 by the bracket 102 of a housing. A flat portion of the valve body 80 is inserted in a slit of an output shaft 111 of the actuator 110. When the valve body 80 is in the position shown, the main and auxiliary air chambers 62,64 communicate to each other so that the spring constant of the air spring 60 is small. On the other hand, when the valve body 80 is rotated and the holes 83,84 therein get out of the holes 76,77 in the piston rod respectively, the valve body 80 closes the holes 76,77. Therefore, the main air chamber 62 is insulated from the auxiliary air chamber 64 to increase the spring constant of the air spring 60. The control rod 52 is located such that the damping force of the shock absorber 20 is increased when the spring constant of the air spring 60 is large and reduced when the spring constant of same is small.

The pressure sensor 18 is constituted by semiconductors, for example, to generate voltage proportional to the differential pressure detected by the pair of pressure detecting means 16,17. In the embodiment shown in FIG. 2, each pressure detecting elements is constituted by a pressure introducing pipe 19 and its port opened to the side of the car body. That is, a pair of small ports are provided respectively at symmetric positions about the surface including the longitudinal center axis of the car body on both sides thereof. A pipe 19 is inserted into each small port to form the pressure detecting means.

When a travelling vehicle receives a side wind, a composite wind of the travelling wind and the side wind acts is the direction of angle $\Psi$ measured from the surface including the longitudinal center axis of the car body so that the left and right sides of the car body 14 will differ from each other in the pressure distribution. The angle $\Psi$ is called aerodynamic sideslip angle.

Figure 5:
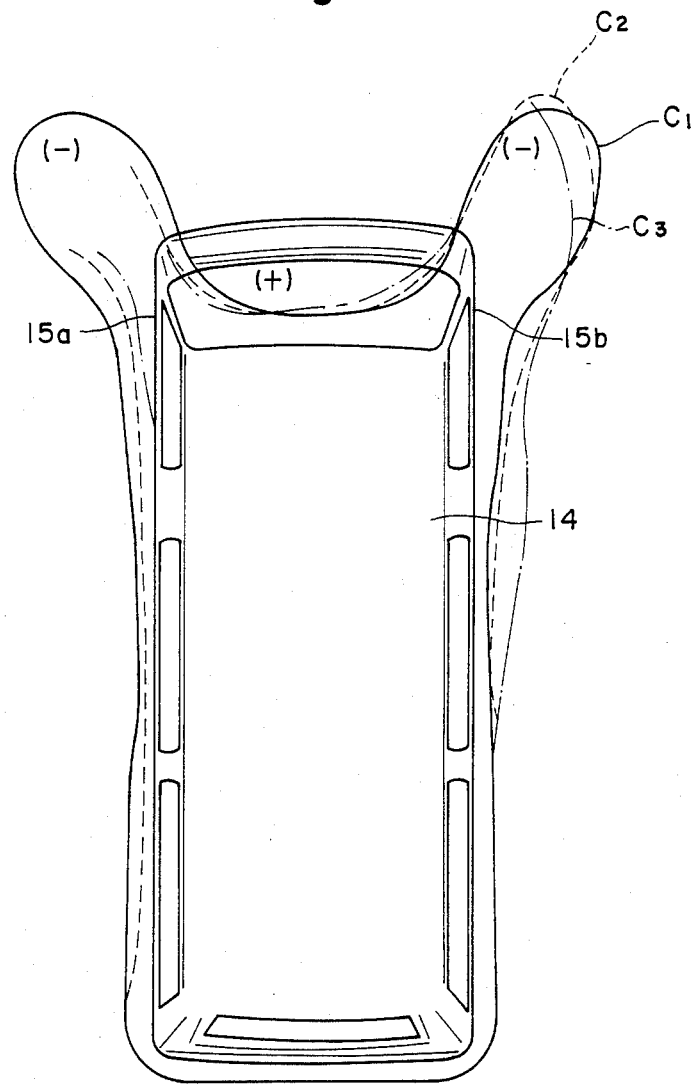
FIG. 5 is a view for explaining the distribution of pressure generated by side wind.

As shown in FIG. 5, the pressure distribution varies with the size of the aerodynamic sideslip angle $\Psi$, for example when the angle $\Psi=0$, i.e., the side wind is absent, it is ($C_1$); when the angle $\Psi$ is small, it is ($C_2$) and when the angle $\Psi$ is large, it is ($C_3$); and varies in portions of the car body 14. And it is known that the pressure distribution has the largest negative pressure in the proximity of both front sides 15a,15b of the car body. Thus, the pair of pressure detecting means 16,17 are preferably disposed on both front sides 15a,15b of the car body 14 to detect pressure in positions of maximum pressure.

The vehicle travelling speed sensor 120 (FIG. 1) detects vehicle speed and sends it to the input of a control unit 122. The vehicle speed sensor 120 is provided on a proper position of the car body.

The control unit 122 calculates the size of lateral force due to side wind according to signals of the pressure sensor 18 and the vehicle speed sensor 120. When the size of the lateral force exceeds a certain value, the control unit 122 controls the suspensions 12 to make the characteristics of the suspensions rigid. In the embodiment shown, the control unit 122 is a CPU, i.e., a computer.

The relationship among the aerodynamic sideslip angle $\Psi$, lateral force F due to side wind, vehicle speed V, differential pressure P, air density $\rho$ and front area S of the car body is as follows, where $K_1$, $K_2$, $K_3$ in the formula are constants:

$$\Psi = V \cdot P \cdot K_1$$

$$F = \tfrac{1}{2} \cdot \rho \cdot V^2 \cdot S \cdot K_2 \cdot K_3$$

Figure 6:
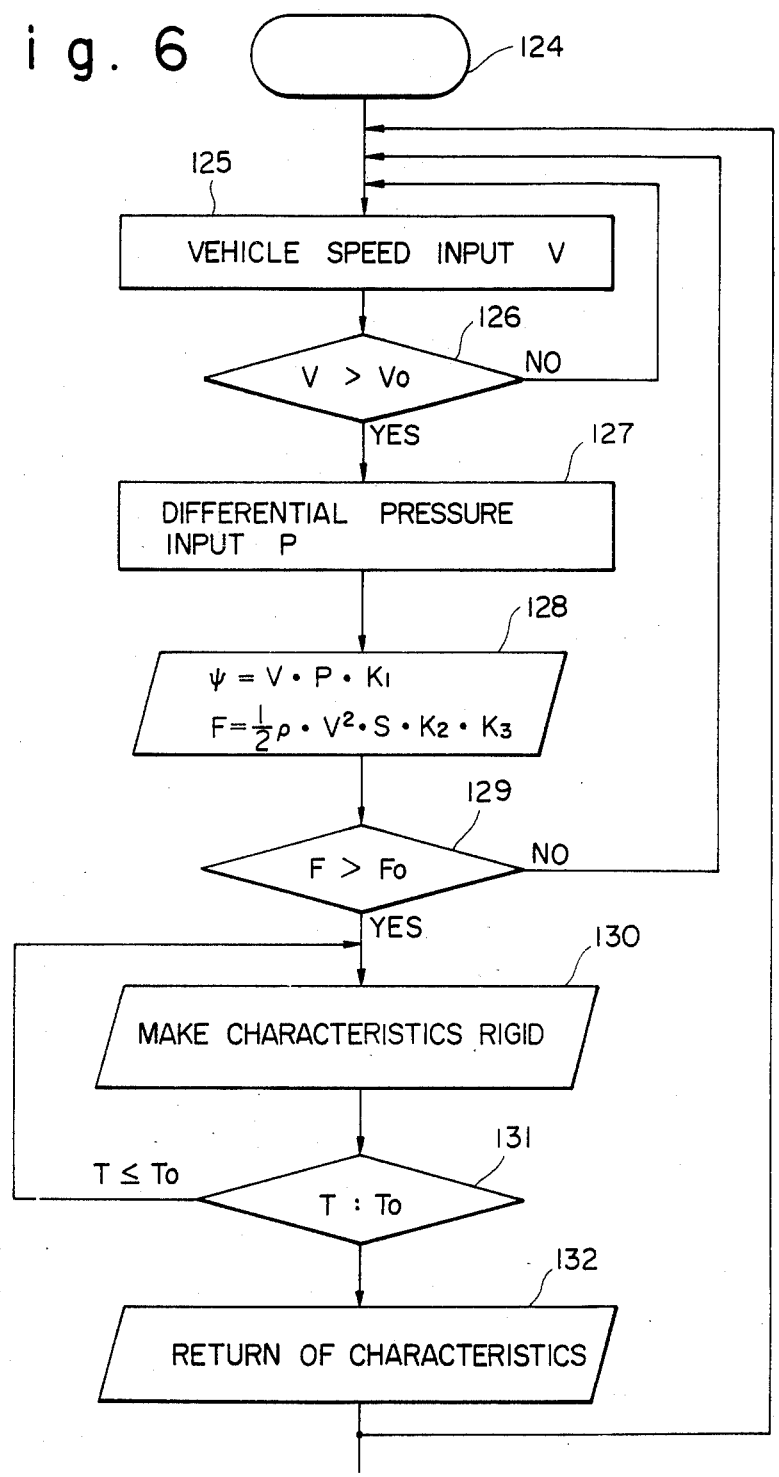
FIG. 6 is a flow chart showing control by a control unit.

When the signals of the vehicle speed sensor 120 and the pressure sensor 18 are sent to the input of the control unit 122, the control unit 122 judges and calculates as shown in FIG. 6, to control the suspensions 12. After initialization (124), the vehicle speed V is put in the input (125) to be compared with a predetermined vehicle speed Vo (126). Since the aerodynamic sideslip angle $\Psi$ is small until the vehicle speed reaches a certain speed, the lateral force F can be neglected. Thus, it is compared with the preset vehicle speed Vo.

Figure 7:
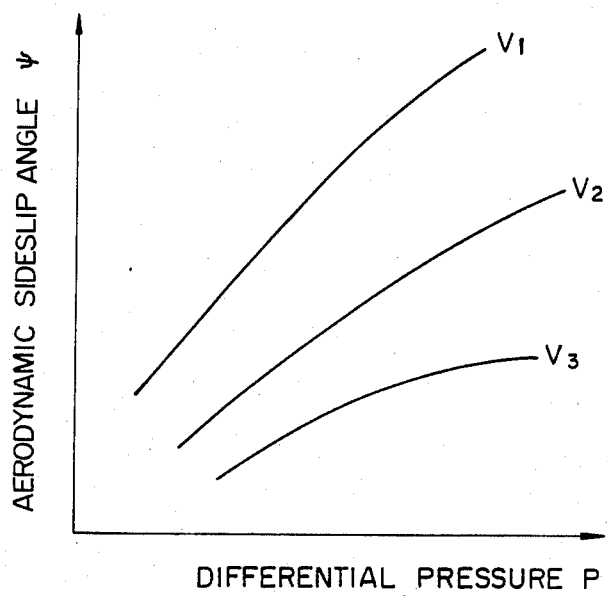
FIGS. 7 and 8 are graphs showing operational characteristics.
Figure 8:
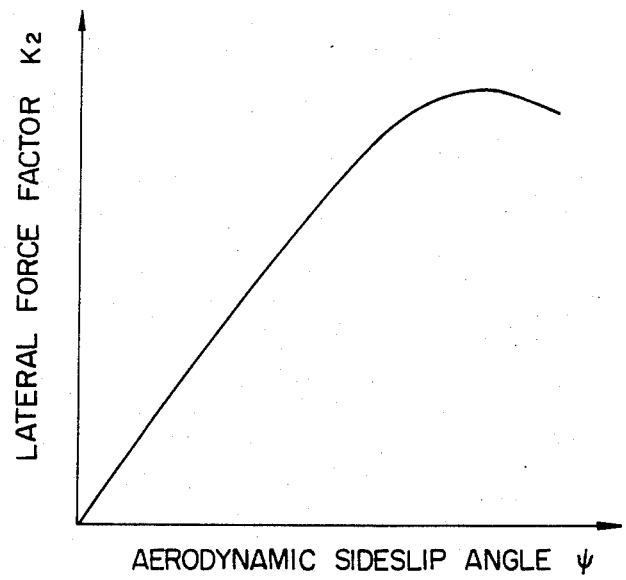

When the vehicle speed V exceeds Vo, the differential pressure P is put in the input (127), and the aerodynamic sideslip angle $\Psi$ and the lateral force F are calculated (128). Here, as shown in FIG. 7, since the constant $K_1$ varies with the vehicle speed and car type, value of the constant $K_1$ is stored previously in the control unit 122 in every range of vehicle speed corresponding to the car type so that proper constant is used to obtain first the aerodynamic sideslip angle $\Psi$. Next, as shown in FIG. 8, the constant $K_2$ corresponding to the car type is obtained from the aerodynamic sideslip angle $\Psi$ and the lateral force F is obtained from the experimentarily determined constant $K_3$, fixed numbers S, $\rho$, etc.

The lateral force F is compared with the lateral force Fo which makes the car body unstable (129) and when the obtained lateral force F exceeds Fo, the control unit 122 controls the actuator 110 of each of the suspensions 12 to make the characteristics of the suspension rigid (130). As a result, the damping force of the shock absorber 20 is increased and the spring constant of the air spring 60 is increased.

Time T taken after making the characteristics of the suspension rigid is measured and compared with a set time To varying with the car type (131). After the set time has elapsed, the characteristics of each of the suspensions is returned to the original condition (132) to complete the control.

In said embodiment, the damping force of the shock absorber and the spring constant of the air spring are controlled simultaneously. Instead, only the damping force of the shock absorber or only the spring constant of the air spring may be controlled according to the type of suspension to make the characteristics of the suspension rigid.

What is claimed is:

1. A vehicle comprising:
   at least one suspension capable of varying characteristics thereof;
   a pressure sensor having two pressure detecting means, one of said pressure detecting means being provided respectively on each lateral side of a car body suspended from said at least one suspension;
   a vehicle speed sensor provided on said car body; and
   a control unit having means for receiving vehicle speed and pressure signals from said speed sensor and pressure sensor, respectively, means for calculating a size of an aerodynamic sideslip angle according to said pressure signal, means for calculating a lateral force according to said vehicle speed signal and said calculated slip angle, means for storing a lateral force of a certain value, and means for controlling said at least one suspension to make characteristics thereof rigid when the size of the lateral force exceeds said certain value.

2. A vehicle as claimed in claim 1, wherein each said at least one suspension includes at least one of a shock absorber capable of adjusting a damping force thereof and an air spring capable of adjusting a spring constant thereof.

3. A vehicle as claimed in claim 1, wherein said pressure detecting means are positioned on said sides at front portions thereof, said front portions having a large pressure as compared with the remainder of said sides.

4. A vehicle as claimed in claim 1, wherein each said pressure detecting means includes a small port provided on one said side, means for generating a voltage proportional to a pressure detected by the two pressure detecting means, and pipes connecting said means for generating with said small ports.

5. A vehicle as claimed in claim 1, including means for storing a certain speed, wherein said control unit includes means for starting control of said at least one suspension when a speed detected by said speed sensor exceeds said cetain speed.

6. A vehicle as claimed in claim 1, wherein said control unit includes means for returning the characteristics of each said suspension to an original condition thereof after a predetermined time elapses after making the characteristics of said suspension rigid.

7. A vehicle comprising:
   at least one suspension capable of varying characteristics thereof;
   a pressure sensor including small ports respectively provided oin the front sides of a car body suspended from the at least one suspension, said front sides having a large pressure distribution as compared to a remainder of said sides, means for generating a voltage proportional to a differential pressure generated by said small ports, and pipes connecting said means for generating with said small ports;
   a vehicle speed sensor provided on said car body; and
   a control unit having means for storing a certain pressure and a certain vehicle speed, means for receiving vehicle speed and pressure signals from said speed sensor and pressure sensor, respectively, means for calculating the size of an aerodymanic sideslip angle according to said pressure signal when said sensed speed exceeds said certain speed, means for calculating a lateral force according to said calculated sideslip angle and said speed signal, and means for controlling said at lesat one suspension to make characteristics thereof rigid when the size of said lateral force exceeds said certain value.

* * * * *